United States Patent [19]

McKinley et al.

[11] 3,725,365

[45] Apr. 3, 1973

[54] RESINS WITH PHOSPHORANE PENDANT GROUPS AND PROCESS FOR PREPARING SAME

[75] Inventors: Suzanne V. McKinley, Wellesley; Joseph W. Rakshys, Jr., Framingham, both of Mass.

[73] Assignee: The Dow Chemical Company, Midland, Mich.

[22] Filed: Apr. 8, 1971

[21] Appl. No.: 132,606

[52] U.S. Cl........260/80.71, 260/80.78, 260/87.5 C, 260/88.1 P, 204/159.2
[51] Int. Cl..........................C08f 19/00, C08f 15/40
[58] Field of Search.......252/426; 260/80.71, 87.5 R, 260/87.5 C, 80.78, 88.1, 88.1 P

[56] References Cited

UNITED STATES PATENTS

| | | | |
|---|---|---|---|
| 2,398,736 | 4/1946 | Dreisbach | 260/87.5 R |
| 3,294,764 | 12/1966 | Pellon | 260/80 |
| 3,300,461 | 1/1967 | Olive | 260/89.5 |
| 3,444,208 | 5/1969 | McClure | 260/590 |

*Primary Examiner*—James A. Seidleck
*Assistant Examiner*—Roger S. Benjamin
*Attorney*—Griswold & Burdick, Stephen Hoynak and Glwynn R. Baker

[57] ABSTRACT

Novel carbon-to-carbon cross-linked resins having a plurality of phosphorane pendant groups are prepared by dehydrohalogenating the corresponding haloalkyl phosphonium salt. The phosphorane-containing resins are useful for converting ketones or aldehydes to olefins via the Wittig reaction. The pendant groups of the novel polymers have the structure

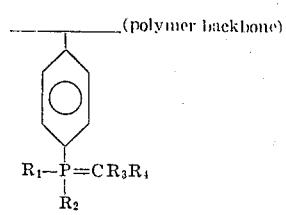

where $R_1$ and $R_2$ each independently is an alkyl or aryl group and $R_3$ and $R_4$ each independently can be hydrogen, alkyl, aryl, acyl, carbalkoxyl, carbamido or cyano group.

17 Claims, No Drawings

RESINS WITH PHOSPHORANE PENDANT GROUPS AND PROCESS FOR PREPARING SAME

BACKGROUND OF THE INVENTION

Methods for preparing monomeric alkylidene phosphoranes and their use in the preparation of olefins by reactions with ketones or aldehydes are described in "Organic Reactions" Volume 14, 1965. In general, these Wittig reagents are prepared by the action of a base on a triphenylalkyl phosphonium halide, under anhydrous and oxygen-free conditions. Examples of bases used are phenyllithium, butyllithium, or potassium t-butoxide.

The Wittig reaction heretofore has been carried out in solution, and often by generation of the alkylidene phosphorane reagent in situ. In such a process the excess reactants must be separated from each other and also from the phosphine oxides which form during the conversion of the carbonyl compound to the olefin. The phosphine oxides are generally less soluble, but not completely insoluble, in the reaction medium. Thus, obtaining products free of organophosphorus contaminants is quite difficult.

The use of cross-linked resins having alkylidene phosphorane pendant groups for effecting the Wittig reaction avoids the problems of separating organophosphorus compounds from the reaction medium and also from contamination with excess of alkylidene phosphorane.

An object of this invention is the provision of a novel polymeric product having a carbon-to-carbon backbone cross-linked with carbon-to-carbon bonds, and having a plurality of alkylidene phosphorane pendant groups.

Another object is the provision of novel cross-linked, insoluble, but organic solvent swellable, polymers having a plurality of alkylidene diaryl phosphorane pendant groups.

Another object is the provision of a method for preparing the said cross-linked resins having alkylidene phosphorane groups.

SUMMARY OF THE INVENTION

This invention relates to addition polymers, cross-linked through carbon-to-carbon linkages, having a plurality of

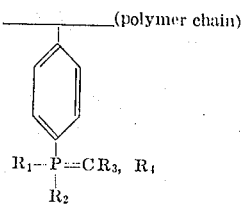

pendant groups on the polymer backbone or main chain. In the above formula the pendant groups are also attached to the cross-linked backbone through saturated carbon-to-carbon bonds. The phosphorus atom can be attached to the phenylene group in the ortho, meta or para position. $R_1$ and $R_2$ can be any alkyl group, either straight or branched chain, a $C_5 - C_8$ cycloalkyl group which can have aryl or aliphatic substituents, or an aryl group which can have from one to four aliphatic hydrocarbon substituents. When $R_1$ or $R_2$ is an alkyl group it is preferably one having one to 10 and more preferably one to four C atoms. When $R_1$ or $R_2$ is a cycloalkyl group it is preferably one having 5 to 8 C atoms. It can be substituted or unsubstituted. If substituted with alkyl groups, the cycloalkyl group can have from one to the sum of the carbon atoms in the ring minus one. The alkyl substituents preferably have from one to about four C atoms per substituent. When $R_1$ and $R_2$ are alkyl $R_3$ and $R_4$ can be independently an aryl group or a substituted derivative thereof, as defined under $R_1$ and $R_2$ above, a hydrogen atom, an alkyl group of from one to about 10 C atoms or a cycloalkyl group or a substituted derivative thereof, as heretofore defined. When $R_3$ and $R_4$ each is independently a hydrogen atom, an alkyl group or a cycloalkyl group, the preferred combination of $R_3$ and $R_4$ is that which will result in the C atom of the methylene group bearing $R_3$ and $R_4$ being less substituted than the C atom of $R_1$ and $R_2$ to which phosphorus is bonded. $R_3$ and $R_4$ combined can also represent the fluorene moiety defined above or a

group attached to the phosphorus atom and when $R_1$ and $R_2$ are both alkyl groups and $R_4$ is H, alkyl or cycloalkyl $R_3$ can be an acyl group of one to 10 atoms, preferably one to six atoms, a carbalkoxyl group of from one to 10 C atoms, a carbamido group or a cyano group.

When $R_1$ or $R_2$ is an aryl group, which is the preferred group for $R_1$, $R_2$ it can be a mono or a polycyclic substituted or unsubstituted group. The polycyclic groups, preferably bi or tricyclic, include naphthyl, biphenylyl, anthranyl, phenanthryl, or the like. When substituted, it is preferable that the substituent be an alkyl group of from one to four C atoms. The number of substituents on each ring can range from one to that sufficient to substitute each hydrogen atom on the aromatic ring with an alkyl group. When $R_1$ and $R_2$ are both aryl groups, the most preferred structures, $R_3$ and $R_4$ can include any of the groups defined below. The preferred aryl groups are phenyl, tolyl, and xylyl.

$R_3$ and $R_4$, each is independently, a hydrogen atom, an alkyl group of from one to about 10 C atoms or a substituted derivative thereof. $R_3$ and $R_4$ combined can represent the

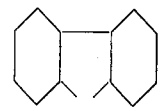

portion of a fluorenyl moiety, and when R is H, alkyl or cycloalkyl $R_3$ can be an aryl group either mono or polycyclic or a substituted derivative thereof, or as defined under $R_1$ and $R_2$ above, an acyl group of one to 10 C atoms, preferably one to six C atoms, a carbalkoxyl group of from one to 10 C atoms or a cyano group.

The cross-linked polymers having a plurality of alkylidene phosphorane pendant groups can be prepared by dehydrohalogenating the corresponding alkylphosphonium halides. The dehydrohalogenating agent is preferably one which does not form water on reacting and necessarily is with highly reactive ylids of this invention. It can be an alkali metal hydrocarbyl compound, including aromatic or aliphatic hydrocarbon alkali metal compounds or any base which will abstract hydrohalide from the phosphonium salt. The preferred dehydrohalogenation agents are hydrocarbon lithium or sodium compound, including phenyllithium, t-butyllithium and sodium dimethyl sulfoxide anion (Na$\overset{+}{\text{C}}$H$_2$S(O)CH$_3$)

In carrying out the reaction the cross-linked polymer with alkyl phosphonium halide groups is first swollen in a solvent which does not react with the dehydrohalogenating agent or the alkylidene phosphorane group. The solvents which are useful for this purpose include tetrahydrofuran and other cyclic ethers having four to eight C atoms, dialkyl sulfoxides having from one to four C atoms in each alkyl group, sulfolane (tetramethylene sulfoxide), hexamethylphosphoramide, dimethoxyethane — other dialkoxy alkanes having from four to 10 C atoms, or mixtures thereof. The dialkyl sulfoxides can be symmetrical or unsymmetrical. Dimethyl formamide is also useful in those instances when an alkali metal hydroxide is used as the hydrohalide extracting agent.

Because of the reactivity of the alkylidene phosphorane group, the reaction is preferably but not necessarily carried out in an oxygen-free atmosphere and under anhydrous conditions. Such conditions are necessary when the alkylidene group (=CR$_3$R$_4$) contains substituents such as a hydrogen atom, aryl group, or cycloalkyl group. Such conditions are desirable but not required when the alkylidene portion containing electron-withdrawing substituents, such as acyl, carbalkoxyl or cyano groups. An oxygen-free atmosphere can be provided by sweeping with any of the noble gases (neon, helium, xenon, argon or krypton) or nitrogen. The solvents can be dried before use with calcium hydride, anhydrous sodium sulfate, sodium metal or by any other known means.

There are several methods for making the alkyl phosphonium halide precursors. One procedure comprises copolymerizing a small amount of a polyolefinic monomer, preferably a polyvinyl aromatic monomer, as a cross-linking ingredient, with a halostyrene in which the halogen has an atomic number greater than 17 (e.g., bromo or iodostyrene) or an alkylated derivative thereof. If desired, a third monoolefin which is copolymerizable with the polyvinyl aromatic compound and the halo styrene or alkylated derivative thereof can be present. Included among such monoolefinic compounds are styrene, α-methyl styrene, vinyl toluene, t-butylstyrene, the vinyl xylenes, isopropenyl toluene, isopropenyl xylenes, ethylstyrenes, and ethyl isopropenylbenzenes, where styrene is preferred.

The resulting copolymer is cross-linked through saturated aliphatic carbon-to-carbon bonds and is insoluble in any known solvent, but can be swollen by the solvents mentioned above as being useful for the dehydrohalogenation. The halostyrene-containing cross-linked polymer is swollen in a solvent and converted to an aryl lithium with an organolithium. The lithiated polymer is then reacted with a diorganochlorophosphine to form the corresponding phosphines as pendant groups.

The phosphine is reacted with an alkyl halide to form the phosphonium halide and then dehydrohalogenated, as described above.

In an alternative procedure monomeric vinylphenyl dihydrocarbylphosphine is polymerized, either alone or with a co-monoolefinic monomer, as described above, with the cross-linking agent. In this manner the proportion of alkylidene phosphorane pendant groups on the polymer molecule can be controlled with great accuracy.

The polymerization of the mixture of monomers can be effected by free radical catalysts, by ionizing or ultra violet radiation or by heat. Included among the effective free radical catalysts are the organic peroxides of which benzoyl peroxide, lauroyl peroxide, t-butylperbenzoate or the various other known peroxide catalysts, and the various known diazo compounds of which azobisisobutyronitrile is a representative. Mixtures of catalysts can be used, if desired.

The amount of catalyst can vary from about 0.1 to about 5 percent by weight of the mixture, the upper limit being only a practical figure.

The cross-linking agents must be polyolefinic, e.g., must contain at least two polymerizable vinyl groups. It is preferably a polyolefinic hydrocarbon. Included among these are divinylbenzene, trivinylbenzene, or diisopropenylbenzene. The cross-linking agents can be used in admixture with each other if desired.

The proportion of cross-linking agent can range from about 0.1 to about 5 percent by weight of the monomers. The amount of vinyl phenyl dihydrocarbylphosphine or its precursor can range from about 10 to about 99.9 percent by weight of the polymerizable mixture. Preferably the vinyl phenyl dihydrocarbylphosphine or its precursor is from about 20 to about 50 weight percent and a monoolefinic comonomer is between about 80 and 50 weight percent.

A method of synthesizing p-vinyltriphenylphospine and its homopolymerization and copolymerization with styrene to form linear polymers is disclosed in Die Makromolekulare Chemie, V. 62, P. 183–195. Conversion of the linear polymers to the methyl phosphonium iodide with CH$_3$I is also disclosed.

The preparation of the precursor cross-linked polymer having pendant phenyl dihydrocarbylphosphine groups can be effected by polymerization in bulk, in solution in an inert solvent, such as a hydrocarbon solvent represented by toluene, in emulsion or in suspension. The suspension procedure is preferred because it produces small fairly uniform beads, which physical form is most desirable for our purposes.

The temperature of polymerization can range from about 40° to about 200° C., the preferred temperature depending in each case upon the catalyst employed.

Pressure has no effect on the polymerization and so autogenous pressure is preferred.

The examples which follow are intended to illustrate, but not to limit the invention. All parts or percentages are by weight unless otherwise indicated.

Example I

Preparation of Precursor Alkyl Phosphonium Halide p-Styryldiphenylphosphine was prepared by reacting

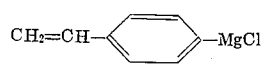

with $(C_6H_5)_2$ P Cl by the procedure described in J. Organic Chem. 26,4157 (1961). A mixture of 4.9 weight parts of p-styryldiphenylphosphine, 5.2 weight parts of styrene and 0.16 ml. of divinylbenzene (95 percent purity) and 0.09 weight parts of azobisisobutyronitrile was agitated until solution resulted. The solution was suspended in 64 ml. of an aqueous phase containing 0.19 percent methylcellulose, 0.15 percent sodium dichromate and 0.5 percent sodium sulfate. The suspension was heated for about 3 hours at about 70° C. The cross-linked copolymeric beads were washed with benzene and dried. Elemental analysis verified that the theoretical amount of phosphorus was present in the polymeric molecule.

The cross-linked polymeric beads, having a carbon-to-carbon backbone and containing a total 0.67 mmoles of triphenylphosphine pendant groups were mixed with a solution of three mmoles of methyl iodide in dimethylsulfoxide. This procedure resulted in substantially complete conversion of the pendant groups to the methyl triphenylphosphonium iodide derivative in about one hour. Excess methyl iodide was removed by washing with a mixture of dimethylsulfoxide and tetrahydrofuran.

Example II

Preparation of Precursor Alkyl Phosphonium Halide

A. A mixture containing a 3:1 molar ratio of styrene and p-bromostyrene and 1.6 percent, based on the total moles of mixture, of divinyl benzene was polymerized at about 80° C., in an aqueous medium containing 0.19 percent methylcellulose, and 0.05 percent sodium dichromate. The cross-linked styrene-p-bromostyrene copolymer was in the form of fine beads.

One gram of the beads was swollen in a mixture of 7 ml. tetrahydrofuran and seven ml. benzene. Approximately four moles of n-butyllithium dissolved in hexane were added to the copolymer-solvent mixture, and the latter was stirred for about 4 hours. The resulting lithioderivative was washed with several portions of diethylether, resuspended in tetrahydrofuran in a nitrogen atmosphere and treated with 2.4 mmoles of chlorodiphenylphosphine to form triphenylphosphine pendant groups on the cross-linked polymer. After about 1-¼ hours excess reagent and by-products were removed by several washings with tetrahydrofuran while excluding air from the system. 5.3 mmoles of methyl iodide was added to a tetrahydrofuran suspension of the phosphine-containing polymers to convert the pendant groups to the triphenylmethylphosphonium iodide derivatives. This step was carried out in a nitrogen atmosphere. The suspension was stirred overnight at room temperature. Excess methyl iodide was removed by several washings of the phosphonium salt form of the polymer with tetrahydrofuran. Elemental analysis of the salts showed about a quantitative conversion of the polymer to phosphonium salt. The salt is stable in air.

Preparation of the Polymeric Ylide

The above-described cross-linked polymer having a carbon-to-carbon backbone, with a plurality of methyl triphenylphosphonium iodide pendant groups was suspended in 10 ml. tetrahydrofuran from which air was excluded by use of nitrogen atmosphere. Swelling required about 3 to 4 hours. A solution of 3.2 mmoles of n-butyllithium in hexane was added to the mixture and stirred for about three hours. The supernatant liquid was removed and the beads were washed several times, over a 6 hour period, with tetrahydrofuran.

The polymeric beads, having methylene triphenylphosphorane pendant groups was suspended in five ml. tetrahydrofuran in a nitrogen atmosphere and a 0.3 ml. of cyclohexanone was added. The supernatant liquid was separated by gas chromatography and showed a peak for methylene cyclohexane. It is estimated that about 20 percent of the cyclohexanone was converted to methylene cyclohexane.

Preparation of Methylene Triphenyl Phosphorane

This reaction was carried out in a nitrogen atmosphere. To the methyl triphenyl phosphonium iodide was added a solution of 3.2 mmoles of sodium dimethylsulfoxide anion in a mixture of dimethylsulfoxide and tetrahydrofuran as the dehydrohalogenating agent. The mixture was stirred for approximately 16 hours. The supernatant liquid was separated. The polymer containing methylene triphenylphosphorane groups was washed several times with tetrahydrofuran. To the resin were added 0.48 moles of cyclohexanone. Analysis of the supernatant liquid by gas liquid chromatography showed that about 90 percent of the cyclohexanone was converted to methylenecyclohexane.

It is apparent that

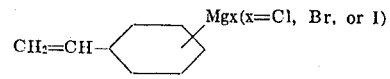

can be reacted with other dihydrocarbyl chlorophosphines to form derivatives of the structure

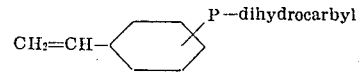

The latter compounds can be polymerized with a polyolefinic cross-linking agent or with the cross-linking agent and one or more other monoolefinic monomers as described above. The resulting cross-linked polymer can then be converted to one having alkyl phosphonium halide groups, and, by dehydrohalogenation of the latter, to a polymer having a plurality of alkylidene dihydrocarbyl phosphorane groups, by following the above procedure.

We claim:

1. Insoluble aromatic addition polymers, cross-linked through carbon-to-carbon bonds derived from copolymerizing from about 0.1 to about 5 weight percent of a polyolefinic monomer with from about 99.9 to about 95 weight percent of a monoolefinic aromatic monomer, said polymers having from about 10 to about 99.9 weight percent of

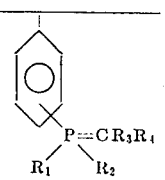

pendant groups on a carbon-to-carbon polymer backbone, wherein $R_1$ and $R_2$ each independently is an alkyl group having from one to about 10 C atoms, a cycloalkyl group, an aromatic hydrocarbon substituted cycloalkyl group, a $C_1$-$C_4$ alkyl substituted cycloalkyl group in which the substituents range from one to the number sufficient to replace each hydrogen atom of said cycloalkyl group, an aryl group having from one to three aromatic hydrocarbon rings, a $C_1$-$C_4$ alkyl substituted derivative of said aryl groups in which the number of substituents ranges from one to the number sufficient to replace each hydrogen atom on said aryl group, the said alkyl substituent having from one to four C atoms, when $R_1$ and $R_2$ are both said alkyl groups (A) $R_3$ and $R_4$ each represents, independently, a hydrogen atom, said aryl, alkyl or cycloalkyl groups, and (B) $R_3$ and $R_4$ combined represent the

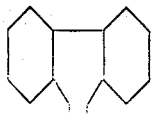

moiety of fluorene and the

moiety of cyclopentadiene; when $R_4$ represents a hydrogen atom, a said alkyl group or a said cycloalkyl group $R_3$ represents an acyl group of one to 10 C atoms, a carbalkoxy group of from one to 10 C atoms, a carbamido group or a cyano group; when $R_1$ and $R_2$ each independently represents an aryl group, $R_3$ and $R_4$ each independently represents a hydrogen atom, a said alkyl group and $R_3$ and $R_4$ combined represents the

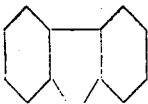

portion of a fluorene moiety; and when $R_4$ is a hydrogen atom a said alkyl or cycloalkyl group, $R_3$ represents a said aryl group, an acyl group of one to 10 C atoms, a carbalkoxy group of from one to 10 C atoms or a cyano group.

2. The polymer of claim 1 in which $R_1$ and $R_2$ each is an unsubstituted aryl group having from one to three aromatic rings.

3. The polymer of claim 2 in which $R_1$ and $R_2$ each is a phenyl group.

4. The polymer of claim 2 in which $R_1$ and $R_2$ each is a methyl substituted phenyl group having from one to two methyl groups on the ring.

5. The polymer of claim 1 in which $R_1$ and $R_2$ each is an alkyl group of from one to about four C atoms.

6. The polymer of claim 1 in which $R_1$ is a phenyl group and $R_2$ is an alkyl group of from one to about four C atoms.

7. The polymer of claim 1 in which $R_3$ and $R_4$ each is hydrogen.

8. The polymer of claim 1 in which $R_3$ and $R_4$ each is an alkyl group of from one to about 10 C atoms.

9. The polymer of claim 1 in which $R_3$ is hydrogen and $R_4$ is an alkyl group of from one to four C atoms.

10. The polymer of claim 1 in which $R_3$ is hydrogen and $R_4$ is a carbalkoxy group of from two to 10 C atoms.

11. The polymer of claim 1 in which $R_3$ is hydrogen and $R_4$ is a cyano group.

12. A method of preparing insoluble, cross-linked addition polymers, in which the cross-linking occurs through carbon-to-carbon bonds through copolymerization of from about 0.1 to about 5 weight percent of a polyolefinic monomer with from about 99.9 to about 95 weight percent of a monoolefinic aromatic monomer, said polymer having from about 10 to about 99.9 weight percent of

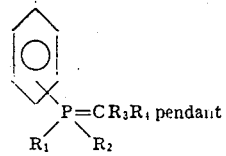

groups on a carbon-to-carbon polymer backbone, wherein $R_1$, $R_2$, $R_3$ and $R_4$ each have the same designations in Claim 1, said method comprising swelling in a polar organic solvent, under anhydrous conditions and in an inert atmosphere an insoluble, cross-linked precursor polymer in which the pendant group has the structure

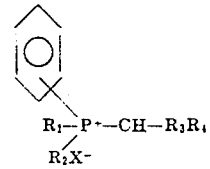

wherein
$R_1$, $R_2$, $R_3$ and $R_4$ are the same as above defined and X is a halogen atom, and dehydrohalogenating said precursor with an alkali metal hydrocarbyl compound.

13. The method of claim 12 in which the swelling solvent is selected from the class consisting of tetrahydrofuran, liquid dialkyl ethers of from four to 10 C atoms, cyclic ethers having four to eight C atoms, dialkoxalkanes having three to 10 C atoms, dialkyl sulfoxides having from two to four C atoms, hexamethylphosphoramide or dimethyl formamide, and mixtures of said solvents.

14. The method of claim 12 in which alkali metal hydrocarbyl compound is an alkyl alkali metal.

15. The method of claim 14 in which the alkyl alkali metal is an alkyl lithium compound.

16. The method of claim 12 in which the pendant group of the precursor has the structure

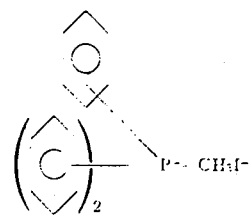

and the dehydrohalogenating agent is sodium dimethylsulfoxide anion in which the alkyl group has from four to five C atoms.

17. The method of claim 15 in which the swelling agent is a mixture of tetrahydrofuran and dimethylsulfoxide.

* * * * *